(12) United States Patent
Nakayama et al.

(10) Patent No.: US 10,323,921 B2
(45) Date of Patent: Jun. 18, 2019

(54) ROUNDNESS MEASURING APPARATUS

(71) Applicant: MITUTOYO CORPORATION, Kanagawa (JP)

(72) Inventors: Tatsuki Nakayama, Kure (JP); Kazushige Ishibashi, Kure (JP)

(73) Assignee: MITUTOYO CORPORATION, Kanagawa (JP)

( * ) Notice: Subject to any disclaimer, the term of this patent is extended or adjusted under 35 U.S.C. 154(b) by 129 days.

(21) Appl. No.: 15/664,273

(22) Filed: Jul. 31, 2017

(65) Prior Publication Data

US 2018/0058836 A1 Mar. 1, 2018

(30) Foreign Application Priority Data

Aug. 31, 2016 (JP) ................................ 2016-169154

(51) Int. Cl.
*G01B 5/20* (2006.01)

(52) U.S. Cl.
CPC .................... *G01B 5/201* (2013.01)

(58) Field of Classification Search
CPC ................................................. G01B 5/201
USPC .................... 33/503, 550, 551, 556
See application file for complete search history.

(56) References Cited

U.S. PATENT DOCUMENTS

| 9,151,588 | B2 | 10/2015 | Sakurada et al. |
| 9,803,968 | B2 | 10/2017 | Nakayama |
| 2001/0008994 | A1 | 7/2001 | Omori et al. |
| 2003/0006756 | A1* | 1/2003 | Tsuruta ............... F16C 32/0696 269/21 |
| 2013/0133409 | A1* | 5/2013 | Nakayama ............. G01B 3/008 73/104 |
| 2016/0084631 | A1* | 3/2016 | Nakayama ............. G01B 5/201 33/550 |
| 2016/0161239 | A1* | 6/2016 | Takanashi ............. G01B 5/201 33/551 |
| 2018/0149457 | A1* | 5/2018 | Masuta .................... G01B 5/08 |
| 2018/0299247 | A1* | 10/2018 | Honda ................. G01B 5/0004 |

FOREIGN PATENT DOCUMENTS

JP       3511494 B      3/2004

OTHER PUBLICATIONS

U.S. Appl. No. 15/689,370 to Tatsuki Nakayama et al., filed Aug. 29, 2017.

* cited by examiner

*Primary Examiner* — George B Bennett
(74) *Attorney, Agent, or Firm* — Greenblum & Bernstein, P.L.C.

(57) ABSTRACT

A roundness measuring device including: an angle detector detecting a current rotation angle of a table relative to an X axis direction; a joystick (external operator) issuing an instruction for an operation amount of a rotation axis line of the table; a centering controller calculating a CX axis displacement amount and a CY axis displacement amount from the operation amount and the rotation angle, and displacing a CX axis displacement mechanism and CY axis displacement mechanism based on the calculated CX axis displacement amount and CY axis displacement amount; and a centering controller calculating an LX axis tilt amount and an LY axis tilt amount from the operation amount and the rotation angle, and displacing an LX axis tilt mechanism and LY axis tilt mechanism based on the calculated LX axis tilt amount and LY axis tilt amount.

7 Claims, 8 Drawing Sheets

ROUNDNESS MEASURING APPARATUS

CROSS-REFERENCE TO RELATED APPLICATIONS

The present application claims priority under 35 U.S.C. § 119 of Japanese Application No. 2016-169154, filed on Aug. 31, 2016, the disclosure of which is expressly incorporated by reference herein in its entirety.

BACKGROUND OF THE INVENTION

1. Field of the Invention

The present invention relates to a roundness measuring device.

2. Description of Related Art

A roundness measuring device is used as a measurer measuring roundness of a work piece. The roundness measuring device includes, on a base, a table capable of rotating around a vertical rotation axis line (Z axis) and on which the work piece can be placed, and a rotation drive mechanism rotating the table. The roundness measuring device further includes a column standing upright on the base, an elevation slider capable of rising and lowering in an up/down direction along the column, a slide arm supported by the elevation slider and capable of sliding in a horizontal direction, and a detection device mounted to a forefront end of the slide arm. The detection device is capable of outputting, as an electric signal, a change in position of a stylus touching the work piece. With such a roundness measuring device, by rotating the work piece to be measured in a state situated on the table while bringing the detection device into contact with a predetermined height position on an outer peripheral surface of the work piece, a circumferential shape of the work piece at the contacted height position can be measured.

In the roundness measuring device, when performing a measurement operation, operations adjusting the rotation axis line of the work piece are required, which are known as a centering operation and a leveling operation (together, a centering/leveling operation). The centering operation refers to an operation mechanistically correcting a horizontal direction offset between the rotation axis line of the table and a center axis line of the work piece. The leveling operation refers to an operation mechanistically correcting to a state where a top surface of the table is horizontal, i.e., mechanistically correcting a tilt between the rotation axis line of the table and the center axis line of the work piece. In a state where the centering operation and the leveling operation have been ended, the rotation axis line of the table is aligned with the center axis line of the work piece, the work piece is rotated by the table centered on the center axis line of the work piece, and an accurate roundness can be measured at any height position on the circumferential surface.

In the conventional roundness measuring device, in order to perform the centering operation and leveling operation described above, a table having a dedicated adjustment mechanism installed (centripetal table) is used (see Japanese Patent No. 3,511,494). In order to perform the centering operation, a rectangular coordinate system is defined for the centripetal table by a CX axis and a CY axis, which extend horizontally with a rotation axis line of the table as an origin point. In addition, in order to change a position of a work piece placed on the table in a CX axis direction and CY axis direction, a CX axis adjustment mechanism and a CY axis adjustment mechanism are provided. The CX axis adjustment mechanism and the CY axis adjustment mechanism can respectively adjust a CX axis direction position and a CY axis direction position of the work piece relative to the rotation axis line by, for example, displacing a placement plate on which the work piece is situated in the CX axis direction and the CY axis direction relative to a table main body.

In order to perform the leveling operation, a rectangular coordinate system is defined for the centripetal table by an LX axis and an LY axis, which extend horizontally with the rotation axis line of the table as an origin point. In addition, in order to tilt the work piece placed on the table in the LX axis direction and LY axis direction, an LX axis adjustment mechanism and an LY axis adjustment mechanism are provided. The LX axis adjustment mechanism and the LY axis adjustment mechanism can respectively tilt the placement plate relative to the LX axis direction and LY axis direction by, for example, lifting one of an LX axis direction and LY axis direction side of the placement plate on which the work piece is situated relative to the table main body, and can thereby respectively adjust an LX axis direction tilt and an LY axis direction tilt of the work piece relative to the rotation axis line. Each of the CX, CY, LX, and LY axis adjustment mechanisms may be manually driven, using a mechanism similar to a micrometer head, or may be motor driven.

In a roundness measuring device that includes the centripetal table described above, the centering operation and leveling operation (centering/leveling operation) of the work piece is performed before the measurement operation. In the centering/leveling operation, each of the CX axis, CY axis, LX axis, and LY axis of the centripetal table is sequentially matched with an X axis of the roundness measuring device (axis of displacement of the detection device by the slide arm) and, in this state, a knob of each axis adjustment mechanism (CX axis, CY axis, LX axis, and LY axis) is manually rotated to perform adjustment. In this scenario, for the centering operation, the CX axis knob and CY axis knob are alternately adjusted. Also, for the leveling operation, the LX axis knob and LY axis knob are alternately adjusted. Accordingly, the centering operation and leveling operation may be complicated due to performing adjustment while moving between two axes lying in intersecting directions.

In order to avoid such complicated operation, in a subset of roundness measuring devices, there is development of a roundness measuring device in which the centering operation and leveling operation described above are automated. However, in order to add automatic centering/leveling to an already operating roundness measuring device, each axis adjustment mechanism must be made motor-driven, and control software executing the adjustment operation must be updated. This involves large-scale structural and cost demands, which is a barrier to implementation.

SUMMARY OF THE INVENTION

The present invention provides a roundness measuring device that is readily implemented and that can simplify a rotation axis line adjustment operation.

A roundness measuring device according to the present invention includes a table provided with a placement plate on which a work piece is placed, the table rotating around a rotation axis line and causing the work piece placed on the placement plate to rotate; and a detection device provided with a stylus brought into contact with the work piece placed on the placement plate, the detection device detecting a change in position of the stylus, the roundness measuring device bringing the stylus into contact with a peripheral surface of the work piece when the table is rotated and measuring a circular shape of the work piece from the change in position of the stylus detected by the detection device. The roundness measuring device includes a first displacement mechanism and a second displacement mechanism installed on the table, the first displacement mechanism and second displacement mechanism respectively displacing the placement plate in a first displacement axis direction and a second displacement axis direction orthogonal to the rotation axis line; an angle detector detecting a current rotation angle of the table; an external operator issuing an instruction for an operation amount of the work piece placed on the placement plate, the operation amount occurring in an operation direction orthogonal to the rotation axis line; and a centering controller calculating a first displacement amount in the first displacement axis direction and a second displacement amount in the second displacement axis direction from the operation amount and the rotation angle, and driving the first and second displacement mechanisms based on the calculated first and second displacement amounts.

In the present invention, any device capable of adjusting at least one variable may be used as the external operator, such as a joystick, an operation device having a slide volume, or the like externally connected to a device main body, and the external operator may be connected to the device main body by a wired or a wireless connection. The external operator may also be mounted to an exterior portion of the device main body. In the present invention, a procedure of calculating the first and second displacement amounts from an operation amount dX and a rotation angle θ may perform any common geometric arithmetic operation. An operation can be used in which the operation amount dX is distributed into components according to the angle θ. For example, when the first and second displacement axes are designated as the CX axis and CY axis of the table, a CX axis displacement amount dCX and a CY axis displacement amount dCY (the first and second displacement amounts) can be calculated by $dCX=dX\cdot\cos(\theta)$ and $dCY=dX\cdot\sin(\theta)$ or the like, respectively. In the present invention, the angle detector can use an existing configuration of the roundness measuring device without alteration.

In the present invention, the centering operation is performed as follows. First, for example, a cylindrical work piece is placed on the placement plate of the table, and in a state where the stylus is in contact with the peripheral surface of the work piece, the table is rotated. Accompanying the rotation of the table, the stylus traces the peripheral surface of the work piece, and the shape of the work piece at the height where the stylus is in contact (for example, a Z axis position) can be measured. When the geometric center axis line of the work piece is offset from the rotation axis line of the table, a horizontal direction position of a contact position of the stylus (for example, an X axis position) may increase or decrease (oscillate) accompanying the rotation of the work piece (i.e., in accordance with the angle of the rotation). Given this, a worker rotates the table, finds a position where the X axis position of the stylus in contact with the work piece is greatest (or smallest), and stops the table at that position. At this time, the maximum center drift of the work piece is oriented in the X axis direction, meaning that the X axis direction is the operation direction in which the center drift must be adjusted. An angle position of the table in this state is designated as the rotation angle θ. In addition, as an operation to adjust the centering, adjustment is performed such that the X axis position of the stylus in contact with the work piece equals a median value between the maximum and minimum.

Specifically, while in the state where the stylus is in contact with the work piece (state where the X axis position is the maximum or minimum), the external operator (such as a joystick) is operated. Through such operation, an instruction is issued for the operation amount dX corresponding to a displacement amount of the placement plate relative to the rotation axis line of the table. The instructed operation amount dX is referenced by the centering controller. When the external operator is operated and the instruction for the operation amount dX is issued, the centering controller obtains the rotation angle θ of the table at that moment from the angle detector, and the first and second displacement amounts (for example, the CX axis displacement amount dCX and the CY axis displacement amount dCY) are calculated from the operation amount dX (displacement amount over a distance corresponding to the operation amount dX) and the rotation angle θ. The centering controller then causes the CX axis displacement mechanism (first displacement mechanism/displacer) to perform displacement based on the calculated first displacement amount (CX axis displacement amount dCX) and causes the CY axis displacement mechanism (second displacement mechanism/displacer) to perform displacement based on the second displacement amount (CY axis displacement amount dCY). Through simultaneous displacement in both the first and second displacement axes, the placement plate and the work piece are displaced by the operation amount dX in the operation direction (X axis direction) relative to the rotation axis line of the table. In this state, the offset of the center axis line of the work piece described above becomes a change in position in the operation direction (X axis direction). Accordingly, through displacement over a distance in accordance with the operation amount dX, the offset of the center axis line of the work piece can be reduced. Also, when displacement over the distance in accordance with the operation amount dX using the external operator is repeated a plurality of times and the operation direction position of the stylus in contact with the work piece (X axis position) equals the median value of the maximum and the minimum described above (median value of an amount of oscillation of the center axis line), the centering operation ends at that position.

In this way, according to the present invention, in a state where the stylus is in contact with the work piece, by rotating the table and detecting the offset of the center axis line of the work piece, and operating the external operator while looking at the current position of the work piece detected by the stylus, the offset of the center axis line of the work piece can be gradually reduced, and by ultimately eliminating the offset, the centering operation can be performed. Therefore, according to the present invention, there is no need for operations separately adjusting the first and second displacement axes, and the centering operation can be simplified. Also, the centering operation based on the present invention is similar to an operation which gradually shifts the work piece having an offset center position in the operation direction exhibiting the maximum offset, for example, and the operation can be readily and intuitively understood by the worker. Moreover, the first and second displacement mechanisms are motor-driven, and when the centering controller is incorporated into the control device and the external operator is connected, the present invention can be readily implemented. In particular, large-scale software converting to full automation, as with existing automatic centering/leveling, is not required, facilitating implementation.

In the roundness measuring device according to the present invention, preferably, a first tilt mechanism and a second tilt mechanism are further installed on the table, the first and second tilt mechanisms respectively adjusting a tilt of the placement plate relative to a first tilt axis direction and a second tilt axis direction orthogonal to the rotation axis line; and a leveling controller is further provided calculating a first tilt amount relative to the first tilt axis direction and a second tilt amount relative to the second tilt axis direction from the operation amount and the rotation angle $\theta$, and driving the first and second tilt mechanisms based on the calculated first and second tilt amounts.

In the present invention, after the above-described centering operation according to the present invention (adjustment of first and second displacement axis positions), a similar operation is performed at a different height (Z axis position) on the work piece, and thereby a tilt of the work piece relative to the first and second tilt axes (for example, an LX axis and an LY axis) can be adjusted. In other words, even in a state where the above-described centering operation ends at the predetermined height position on the work piece, when the center axis line of the work piece is tilted with respect to the rotation axis line of the table, offset of the center axis line manifests at a different height position on the work piece. In a state where this offset is matched to the X axis direction and designated as the operation direction, for example, through displacement by an operation amount dX similar to that of the centering operation described above, the placement plate can be tilted by the first and second tilt mechanisms (for example, an LX axis tilt mechanism and a LY axis tilt mechanism), the tilt of the center axis line of the work piece can thus be reduced, and as a result, the leveling operation of the table can be performed.

Specifically, while in the state where the stylus is in contact with the work piece (state where the position in the X axis direction (operation direction) is the maximum or minimum), the external operator (such as the joystick) is operated. Through such operation, an instruction is issued for the operation amount dX tilting the placement plate relative to the rotation axis line of the table. The instructed operation amount dX is referenced by the leveling controller. When the external operator is operated and the instruction for the operation amount dX is issued, the leveling controller obtains the rotation angle $\theta$ of the table at that moment from the angle detector, and the first and second tilt amounts (LX axis tilt amount $\phi LX$ and LY axis tilt amount $\phi LY$) are calculated from the operation amount dX and the rotation angle $\theta$. The leveling controller further causes the LX axis tilt mechanism to tilt the placement plate based on the calculated LX axis tilt amount $\phi LX$ and causes the LY axis tilt mechanism to tilt the placement plate based on the LY axis tilt amount $\phi LY$. Through simultaneous tilting of both the LX and LY axes, the tilt of the placement plate is modified, and the position of the center axis line of the work piece at the height position where the stylus is in contact is displaced in the X axis direction by a displacement amount corresponding to the operation amount dX. The tilt of the center axis line of the work piece relative to the rotation axis line of the table manifests as offset of the center axis line of the work piece at the height position where the stylus is in contact, and this offset becomes a change in position in the X axis direction. Accordingly, through displacement over a distance in accordance with the operation amount dX, the offset of the center axis line (i.e., the tilt of the center axis line) of the work piece at a different height position on the work piece can be reduced. Also, when displacement over the distance in accordance with the operation amount dX using the external operator is repeated a plurality of times and the X axis position of the stylus in contact with the work piece (operation direction position) equals the median value of the maximum and the minimum described above (median value of the amount of oscillation of the center axis line), the leveling operation ends at that position.

In this way, according to the present invention, in a state where the stylus is in contact with the work piece, by rotating the table and detecting the offset of the center axis line of the work piece, and operating the external operator while looking at the current position of the work piece detected by the stylus, the offset of the center axis line of the work piece can be gradually reduced, and by ultimately eliminating the offset, the leveling operation can be performed. Therefore, according to the present invention, there is no need for operations separately adjusting the first and second tilt axes (LX axis and LY axis), and the leveling operation can be simplified. Also, the leveling operation based on the present invention is similar to an operation which gradually corrects a tilt of the work piece having a tilted center position, correcting the tilt along the operation direction (X axis direction), for example, and the operation can be readily and intuitively understood by the worker. Moreover, the first and second tilt mechanisms (the LX axis tilt mechanism and the LY axis tilt mechanism) are motor-driven, and when the leveling controller is incorporated into the control device and the external operator is connected, the present invention can be readily implemented. In particular, large-scale software converting to full automation, as with existing automatic centering/leveling, is not required, facilitating implementation.

A roundness measuring device according to the present invention includes a table provided with a placement plate on which a work piece is placed, the table rotating around a rotation axis line and causing the work piece placed on the placement plate to rotate; and a detection device provided with a stylus brought into contact with the work piece placed on the placement plate, the detection device detecting a change in position of the stylus, the roundness measuring device bringing the stylus into contact with a peripheral surface of the work piece when the table is rotated and measuring a circular shape of the work piece from the change in position of the stylus detected by the detection device. The roundness measuring device includes a first tilt mechanism and a second tilt mechanism installed on the table, the first tilt mechanism and second tilt mechanism respectively adjusting a tilt of the placement plate relative to the first tilt axis direction and the second tilt axis direction; an angle detector detecting a current rotation angle of the table; an external operator issuing an instruction for an operation amount of the work piece placed on the placement plate, the operation amount occurring in an operation direction orthogonal to the rotation axis line; and a leveling controller calculating a first tilt amount relative to the first tilt axis direction and a second tilt amount relative to the second tilt axis direction from the operation amount and the rotation angle, and driving the first and second tilt mechanisms based on the calculated first and second tilt amounts.

According to the present invention above, the above-described leveling according to the present invention can be achieved independently of the above-described centering.

In the roundness measuring device according to the present invention, preferably, the first and second displacement amounts are values in which a distance corresponding to the operation amount in the operation direction is distributed into components in the first and second displacement axis directions in accordance with the rotation angle, such that a displacement amount combining the first and second displacement amounts is equal to a distance corresponding to the instructed operation amount in the operation direction. In the present invention, the operation amount dX driving the first and second displacement mechanisms during centering can be associated with (made proportionate to, for example) a displacement amount in the operation direction at a predetermined height position of the stylus, and an expected adjustment can be performed reliably.

In the roundness measuring device according to the present invention, preferably, the first and second tilt amounts are displacement amounts in the operation direction at a rotation axis line direction position of the stylus; and the first and second tilt amounts are values distributed into components in the first and second tilt axis directions in accordance with the rotation angle, such that a tilt amount combining the first and second tilt amounts is equal to a distance corresponding to the instructed operation amount in the operation direction at a position of the stylus in the rotation axis line direction. In the present invention, the operation amount dX driving the first and second tilt mechanisms during leveling can be associated with (made proportionate to, for example) a displacement amount in the operation direction at a predetermined height position of the stylus, and an expected adjustment can be performed reliably.

According to the present invention, a roundness measuring device can be provided that is readily implemented and that can simplify a rotation axis line adjustment operation.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Roundness Measuring Device

Figure 1:
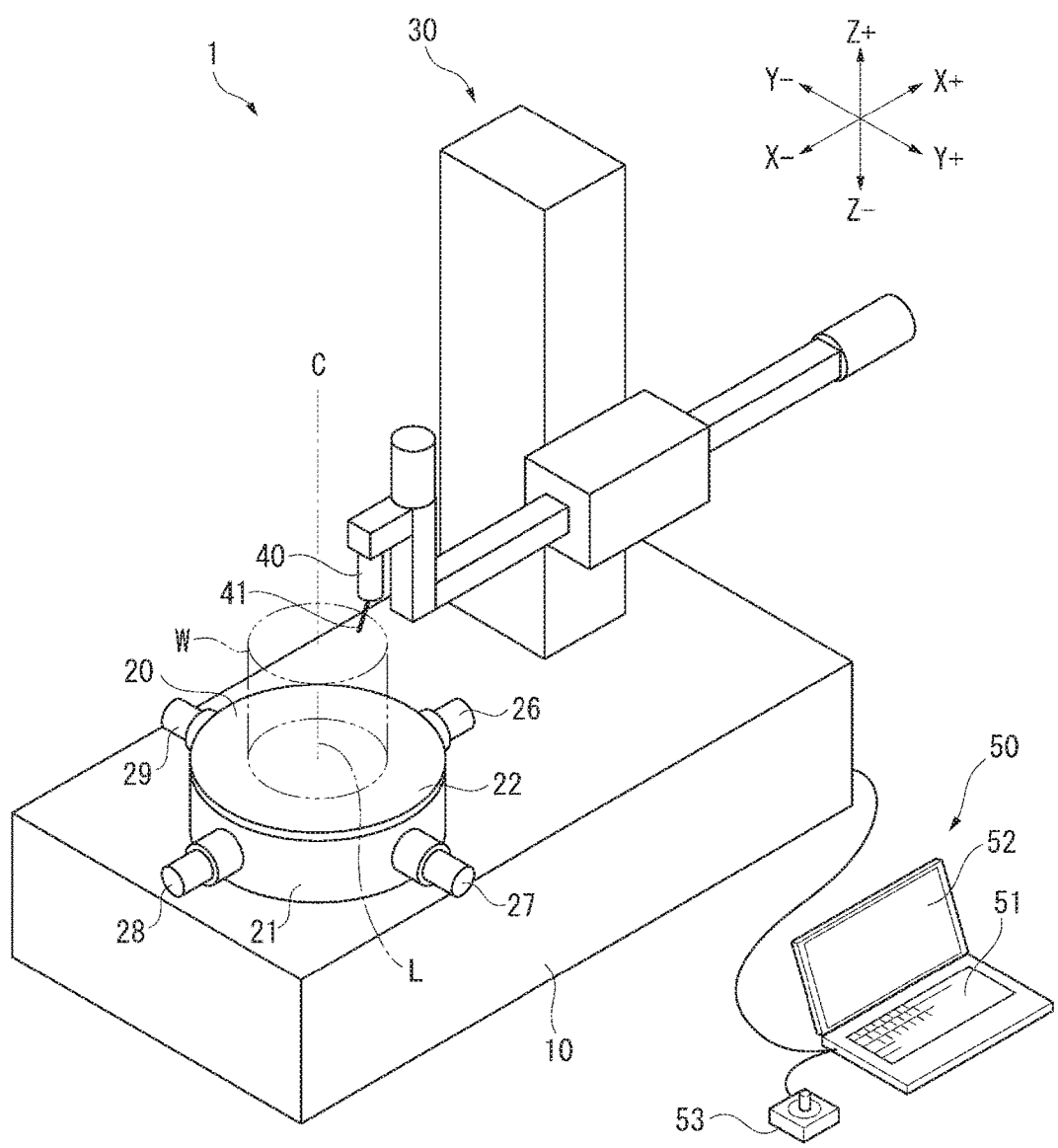
FIG. 1 is a perspective view illustrating an embodiment of a roundness measuring device according to the present invention.
Figure 2:
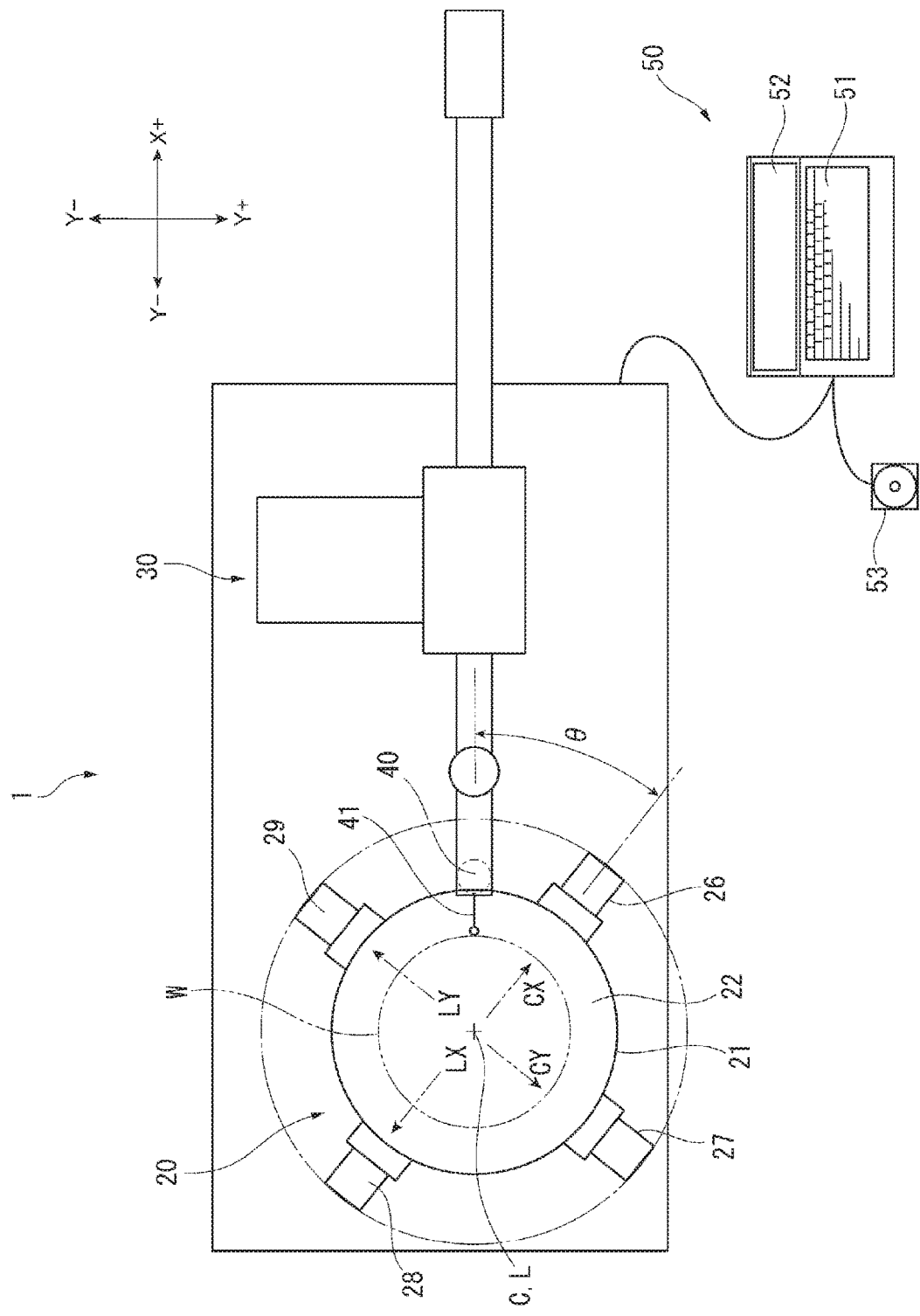
FIG. 2 is a plan view illustrating the roundness measuring device according to the embodiment.

FIGS. 1 and 2 illustrates a roundness measuring device 1 based on the present invention. The roundness measuring device 1 according to the present embodiment includes a base 10 as a device main body, and a table 20 is installed on a top surface of the base 10. The table 20 is driven by a drive mechanism (not shown in the drawings) to rotate relative to the base 10. A rotation axis line L of the table 20 is designated as a Z axis direction (vertical direction) of the base 10. A work piece W is placed on a top surface of the table 20. A center axis line C of the work piece W is positioned extending along the rotation axis line L of the table 20.

A detection device displacement mechanism 30 is installed on the top surface of the base 10, adjacent to the table 20, and a detection device (detector) 40 is supported on the detection device displacement mechanism 30. The detection device displacement mechanism 30 includes displacement mechanisms for various axes (not shown in the drawings) enabling displacement in an X axis direction, Y axis direction, and Z axis direction of the base 10. The detection device displacement mechanism 30 is capable of displacing the detection device 40 to any desired position in each of the X, Y, and Z axis directions. The detection device 40 includes a converter (not shown in the drawings) detecting a stylus 41 and a change in position of the stylus 41. The detection device 40 is capable of signal output for a profile shape of a surface with which the stylus 41 makes contact. The detection device 40 can be displaced by the detection device displacement mechanism 30, and can bring the stylus 41 into contact with a desired height position on a peripheral surface of the work piece W placed on the table 20.

Rotation Axis Line Adjustment Mechanism

An adjustment mechanism is provided to the table 20, the mechanism performing an operation (centering operation and leveling operation) that aligns the rotation axis line L of the table 20 with the center axis line C of the work piece W. The table 20 includes a cylindrical main body 21 installed on the base 10 so as to be capable of rotating, and a disc-shaped placement plate 22 installed on a top surface of the main body 21 so as to be capable of displacement in the horizontal direction.

Provided to a side surface of the main body 21 are a CX axis displacement mechanism 26 and CY axis displacement mechanism 27 displacing the placement plate 22 in a CX axis direction and a CY axis direction, which are both orthogonal to the vertical rotation axis line L and are mutually orthogonal; and an LX axis tilt mechanism 28 and LY axis tilt mechanism 29 adjusting a CX axis direction tilt (LX axis direction) and CY axis direction tilt (LY axis direction) of the placement plate 22.

The CX axis displacement mechanism 26 and CY axis displacement mechanism 27 are structures which slide the placement plate 22 in the CX axis direction and CY axis direction, respectively, through drive from a motor. The CX axis direction and CY axis direction respectively correspond to a first displacement axis direction and second displacement axis direction of the present invention, and the CX axis displacement mechanism 26 and CY axis displacement mechanism 27 respectively correspond to a first displacement mechanism and second displacement mechanism of the present invention. The LX axis tilt mechanism 28 and LY axis tilt mechanism 29 are structures which tilt the placement plate 22 in the LX axis direction and LY axis direction, respectively, through drive from a motor. The LX axis direction and LY axis direction respectively correspond to a first tilt axis direction and second tilt axis direction of the present invention, and the LX axis tilt mechanism 28 and LY axis tilt mechanism 29 respectively correspond to a first tilt mechanism (first tilter) and second tilt mechanism (second tilter) of the present invention.

Control Device

The roundness measuring device 1 includes a control device 50 performing operation control of various portions, including the roundness measurement of the work piece W. The control device 50 of the present embodiment is configured by a personal computer and performs control of the various portions based on an internally stored operation program. In the present embodiment, the control device 50 is separate from the base 10 (device main body), but the control device 50 may also be incorporated with the device main body.

Figure 3:
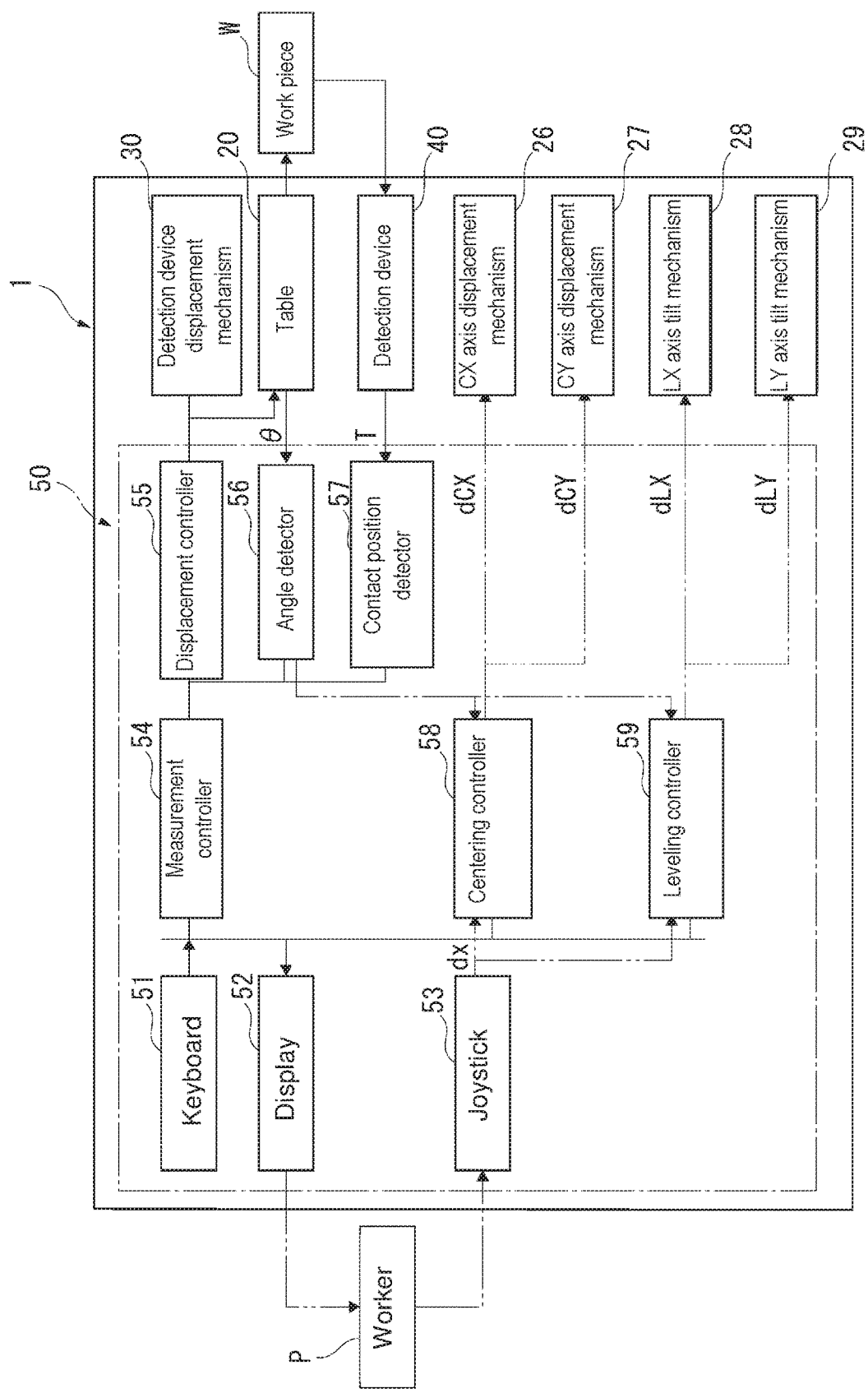
FIG. 3 is a block diagram illustrating a control device of the roundness measuring device according to the embodiment.

In FIG. 3, the control device 50 includes a keyboard 51 and a display 52, through which a worker P can operate the roundness measuring device 1 and read information. A pointing device such as a mouse or touch pad may also be included to provide input. Moreover, a joystick 53 is installed on the control device 50 as an external operator according to the present invention.

The control device 50 includes a measurement controller 54 in order to perform measurement of the profile shape, such as roundness, of the work piece W. The measurement controller 54 is a program describing a predetermined operational procedure, and by initializing the measurement controller 54 in a state where the work piece W is situated on the table 20, the profile shape and roundness of the peripheral surface of the work piece W can be detected.

Specifically, the measurement controller 54 rotates the table 20 via a displacement controller 55 and brings the detection device 40 into contact with the peripheral surface of the work piece W using the detection device displacement mechanism 30. In addition, a current rotation angle $\theta$ (hereafter referred to as an angle $\theta$) of the table 20 is read by an angle detector 56 and a signal indicating a change in position T of the stylus 41, which is output from the detection device 40, is read by a contact position detector 57, and the change in position T for each angle $\theta$ is logged. As a result, the changes in position T ($\theta$) for the entire periphery (i.e., for angles $\theta$=0 to 360°) can be measured and the profile shape and roundness of the peripheral surface of the work piece W can be detected by processing this data.

The control device 50 includes a centering controller 58 and a leveling controller 59 to perform the centering operation and leveling operation of the table 20 before measurement of the work piece W by the measurement controller 54. The centering controller 58 and the leveling controller 59 are each a program describing a predetermined operational procedure.

Figure 4:
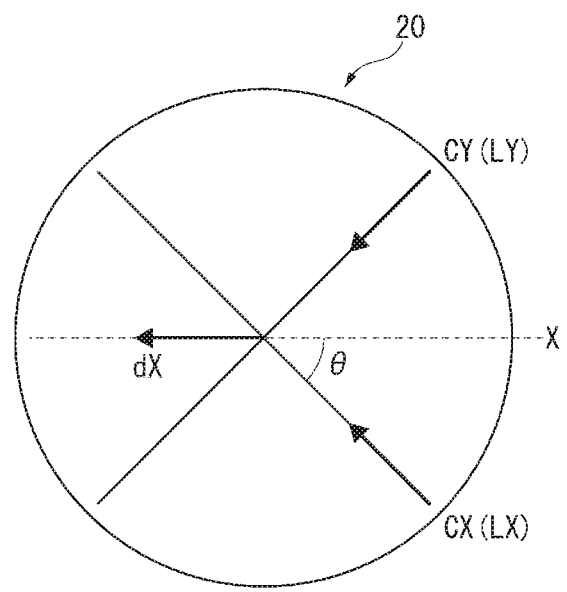
FIG. 4 is a schematic view illustrating a calculation performed in the embodiment.

The centering controller 58 is initialized when the worker P issues an instruction to the control device 50 to perform the centering operation, and the centering controller 58 calculates a CX axis displacement amount dCX (first displacement amount in the present invention) and a CY axis displacement amount dCY (second displacement amount in the present invention) from an operation amount dX in the X axis direction (operation direction in the present invention) input through the joystick 53 and the current angle $\theta$ obtained by the angle detector 56. The centering controller 58 calculates the CX axis displacement amount dCX and the CY axis displacement amount dCY such that, when combined, a displacement amount in the X axis direction is the operation amount dX. In the present embodiment, as shown in FIG. 4, when the current angle $\theta$ of the table 20 detected by the angle detector 56 is defined as the CX axis relative to the X axis, the CX axis displacement amount dCX is calculated by dCX=dX·cos($\theta$) and the CY axis displacement amount dCY is calculated by dCY=dX·sin($\theta$).

Moreover, the centering controller 58 actuates the CX axis displacement mechanism 26 and the CY axis displacement mechanism 27 of the table 20 based on the calculated CX axis displacement amount dCX and CY axis displacement amount dCY. Accordingly, the horizontal position of the placement plate 22 of the table 20 is changed and, ignoring the angle $\theta$, the table 20 is displaced in the X axis direction by the displacement amount dX (i.e., the operation amount dX), which is the combination of the CX axis displacement amount dCX and the CY axis displacement amount dCY.

The leveling controller 59 is initialized when the worker P issues an instruction to the control device 50 to perform the leveling operation, and the leveling controller 59 calculates, at a height position where the stylus 41 makes contact for the leveling operation, an LX axis tilt amount $\phi$LX (first tilt amount in the present invention) and an LY axis tilt amount $\phi$LY (second tilt amount in the present invention) from the operation amount dX input through the joystick 53 and the current angle $\theta$ obtained by the angle detector 56. The leveling controller 59 calculates the LX axis tilt amount $\phi$LX and LY axis tilt amount $\phi$LY such that, when combined, the displacement amount in the X axis direction is the operation amount dX.

The LX axis tilt amount $\phi$LX and the LY axis tilt amount $\phi$LY are complex in comparison to the CX axis displacement amount dCX and the CY axis displacement amount dCY described above, but can be calculated by a geometric arithmetic operation. A summarized calculation may be, with reference to the CX axis displacement amount dCX and CY axis displacement amount dCY and as shown in FIG. 4, defining an LX axis displacement amount dLX as dLX=dX·cos($\theta$) and defining an LY axis displacement amount dLY as dLY=dX·sin($\theta$). Moreover, when a height (Z axis) direction distance between the height position where the stylus 41 makes contact and a center of leveling rotation of the placement plate 22 is designated dZ, and an angle between the center axis line C and the rotation axis line L is designated $\phi$ (angle at which the placement plate 22 tilts due to the operation amount dX), the LX axis tilt amount $\phi$LX and the LY axis tilt amount $\phi$LY can be found in the following way.

$$\phi LX = \tan^{-1}(dLX/dZ)$$
$$= \tan^{-1}(dX \cdot \cos(\theta)/dZ)$$
$$\phi LY = \tan^{-1}(dLY/dZ)$$
$$= \tan^{-1}(dX \cdot \sin(\theta)/dZ)$$

Moreover, the leveling controller 59 actuates the LX axis tilt mechanism 28 and the LY axis tilt mechanism 29 of the table 20 based on the calculated LX axis tilt amount $\phi$LX and LY axis tilt amount $\phi$LY. Accordingly, at the height position where the stylus 41 makes contact for the leveling operation, i.e., within a horizontal plane at that height, ignoring the angle θ, the table 20 is displaced in the X axis direction by the operation amount dX, which is the combination of the LX axis displacement amount dLX and the LY axis displacement amount dLY, which correspond to the LX axis tilt amount ϕLX and LY axis tilt amount ϕLY, respectively. As a result, the placement plate 22 is tilted such that there is no change to a centering state of the placement plate 22, but there is displacement, by the operation amount dX, in the X axis direction at the height position where the stylus 41 makes contact, i.e., such that an upper side of the center axis line C displaces in a −X direction. As a result, the tilt is changed based on the LX axis tilt amount ϕLX and LY axis tilt amount ϕLY (see FIG. 8; a detailed description follows).

Centering Operation

A specific procedure of the centering operation according to the present embodiment is as follows. When performing the centering operation, a cylindrical work piece W is placed on the table 20 ahead of time. The work piece W used in the centering operation is not limited to a cylindrical shape, and may instead be a cone shape, or any shape having a circular cross-section that intersects with the center axis line C (i.e., any shape for which a circular profile shape may be obtained around the center axis line C). Next, the worker P issues an instruction to the control device 50 to execute the centering operation. In the control device 50, the centering controller 58 is initialized. In this state, the procedure illustrated in FIG. 5 is performed.

Figure 5:
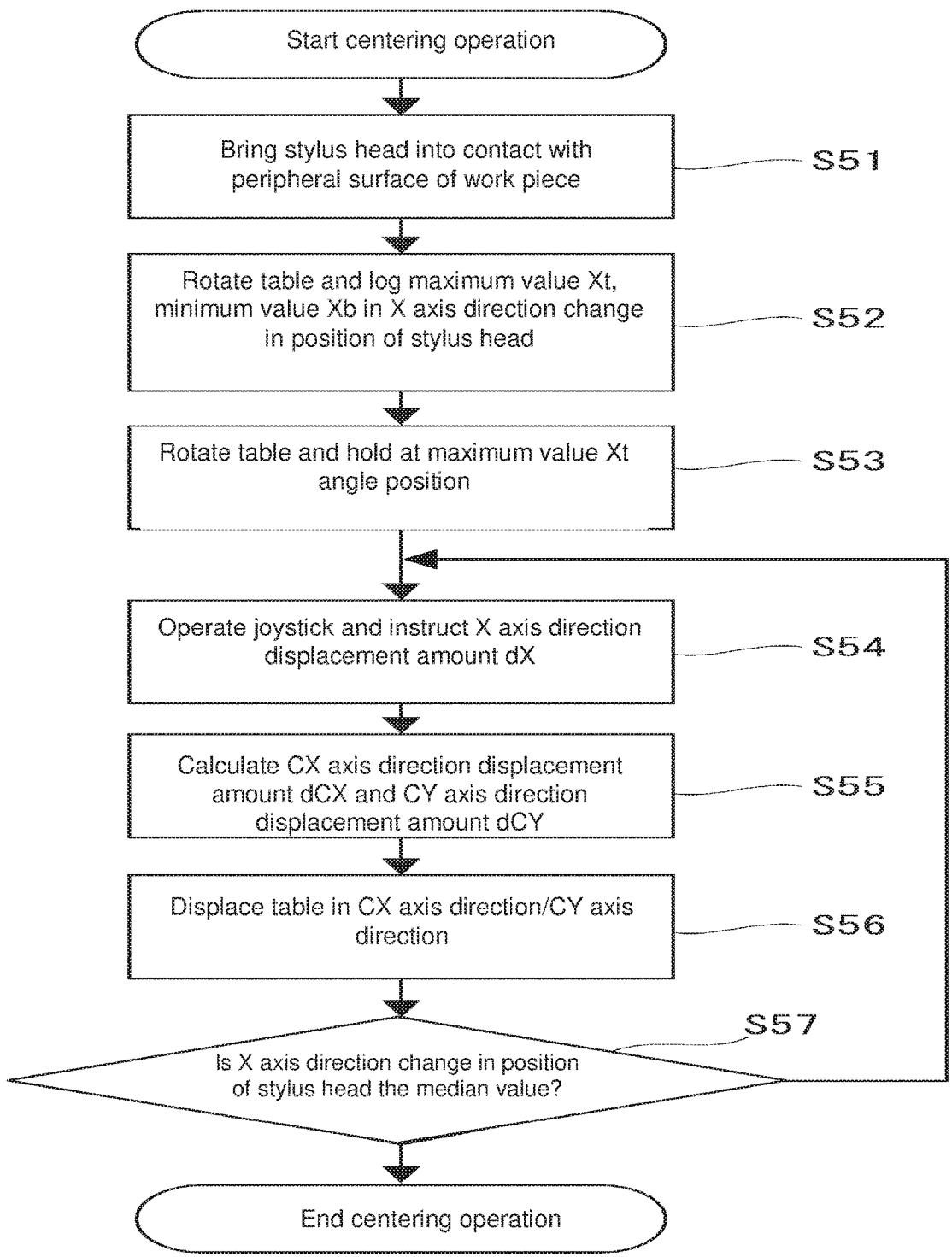
FIG. 5 is a flow chart illustrating a centering operation according to the embodiment.

In FIG. 5, the worker P displaces the detection device 40 in the −X direction with the detection device displacement mechanism 30 (displacement leftward in FIG. 2) and brings the stylus 41 of the detection device 40 into contact with the peripheral surface of the work piece W (process S51 in FIG. 5). The height position (Z axis position) at which the stylus 41 makes contact with the peripheral surface of the work piece W may be any desired height. However, a low position on the work piece W, as close as possible to the placement plate 22, is preferred.

In the state where the stylus 41 is in contact with the peripheral surface of the work piece W, the worker P issues an instruction to the control device 50 and causes the table 20 to rotate. Accompanying the rotation of the table 20, the stylus 41 traces the peripheral surface of the work piece W. Accordingly, in the control device 50, the change in position T of the peripheral surface where the stylus 41 currently makes contact is obtained from the contact position detector 57 and the profile shape of the work piece W at the height position (Z axis position) where the stylus 41 makes contact is measured. The profile shape is logged in the form of the changes of position T (θ) for the angles θ=0 to 360°.

In this example, when the center axis line C of the work piece W and the rotation axis line L of the table 20 become offset, an X axis position of a contact position of the stylus 41 (change in position T) may increase or decrease (oscillate) accompanying the rotation of the work piece W (i.e., in accordance with the angle θ of the rotation). Therefore, a maximum value Xt of an X axis direction change in position oscillating farthest in a +X direction and a minimum value Xb of the X axis direction change in position oscillating farthest in the −X direction come to be present in the changes in position T (θ) described above. The worker P logs the maximum value Xt and the minimum value Xb (process S52).

Next, the worker P displays the current X axis position of the stylus 41 in contact with the work piece W (change in position T obtained from the contact position detector 57) on the display 52, manually rotates the table 20 while looking at the display 52, stops the table 20 at an angle position where the current change in position T is the maximum value Xt (one of the maximum value Xt and the minimum value Xb), and holds the table 20 in this state (process S53).

Figure 6:
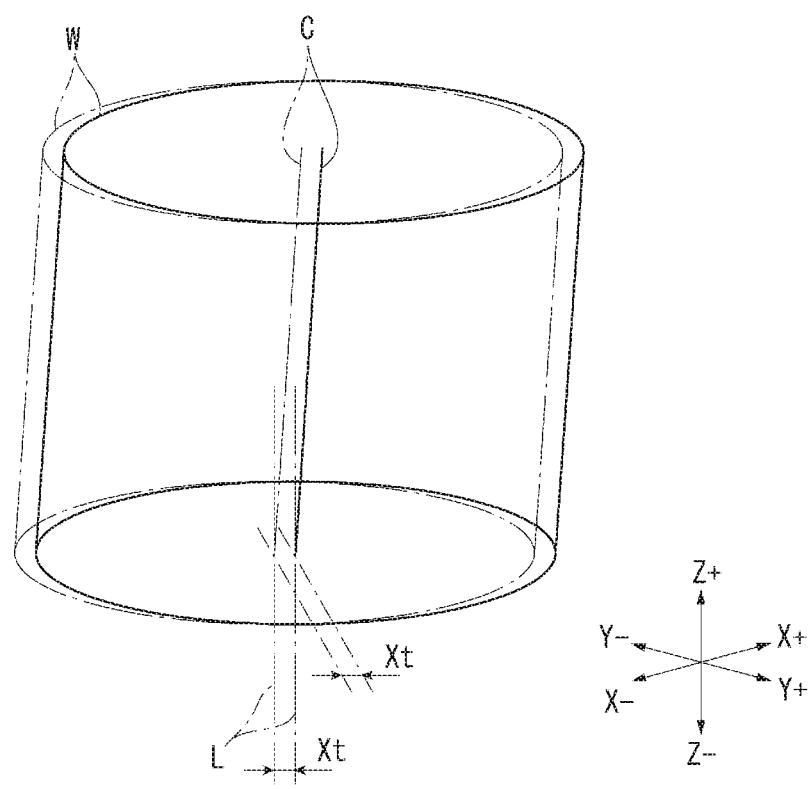
FIG. 6 is a schematic view illustrating a result of the centering operation according to the embodiment.

FIG. 6 illustrates a state of the work piece W (shown in a one-dot-dashed line) in which the center axis line C aligns with the rotation axis line L of the table 20 at the height position of the placement plate 22 of the table 20 (bottom surface of the work piece W). In contrast, the work piece W shown by a solid line is in a state where the center axis line C is offset from the rotation axis line L of the table 20 (center offset state), and in the state illustrated in FIG. 6, the amount of this offset is the maximum value Xt and a direction of the offset is the +X direction. Accordingly, when the work piece W is displaced by the maximum value Xt (amount of offset) in the −X direction, the centered state shown by the one-dot-dashed line in FIG. 6 can be achieved. In order to do this, while looking at the current X axis position of the stylus 41 (change in position T obtained from the contact position detector 57) displayed on the display 52, the worker P displaces the placement plate 22 (work piece W) of the table 20 by slight increments of the operation amount dX using the joystick 53.

In other words, when the joystick 53 is operated, an instruction is issued for the operation amount dX corresponding to a tilt of the stick (process S54). The instructed operation amount dX is input to the centering controller 58. When the centering controller 58 detects the operation amount dX, the angle θ of the table 20 at that moment is obtained from the angle detector 56, and the CX axis displacement amount dCX and CY axis displacement amount dCY are calculated from the operation amount dX and the angle θ (process S55).

The centering controller 58 then causes the CX axis displacement mechanism 26 to perform displacement based on the calculated CX axis displacement amount dCX and causes the CY axis displacement mechanism 27 to perform displacement based on the CY axis displacement amount dCY. Through simultaneous displacement in both the CX and CY axes, the placement plate 22 is displaced in the CX axis and CY axis directions, and the work piece W is displaced by the operation amount dX in the −X direction relative to the rotation axis line L of the table 20 (process S56). Offset of the center axis line C of the work piece W becomes a change in position in the X axis direction, as noted above (see FIG. 6). Accordingly, through the displacement by the operation amount dX, the offset between the center axis line C of the work piece W and the rotation axis line L of the table 20 is reduced by the operation amount dX.

When such displacement by the operation amount dX using the joystick 53 is repeated a plurality of times and the X axis position of the stylus 41 in contact with the work piece W (change in position T displayed on the display 52) equals a median value of the maximum value Xt and the minimum value Xb described above (median value of an amount of oscillation of the center axis line C) (Xt+Xb)/2 (process S57), the centering operation ends at that position. In FIG. 6, in the state where the centering operation is ended, the rotation axis line L of the table 20 and the center axis line C of the work piece W shown by the solid line are aligned at the height position of the placement plate 22 of the table 20 (bottom surface of the work piece W).

Leveling Operation

A specific procedure of the leveling operation according to the present embodiment is as follows. The leveling operation according to the present embodiment is performed in a state where the rotation axis line L of the table 20 and the center axis line C of the work piece W are aligned at the height position of the placement plate 22 of the table 20 (bottom surface of the work piece W; state shown by the solid line in FIG. 6) by the centering operation described above (see FIG. 5). After the above-described centering operation, the worker P issues an instruction to the control device 50 to execute the leveling operation. In the control device 50, the leveling controller 59 is initialized. In this state, the procedure illustrated in FIG. 7 is performed.

Figure 7:
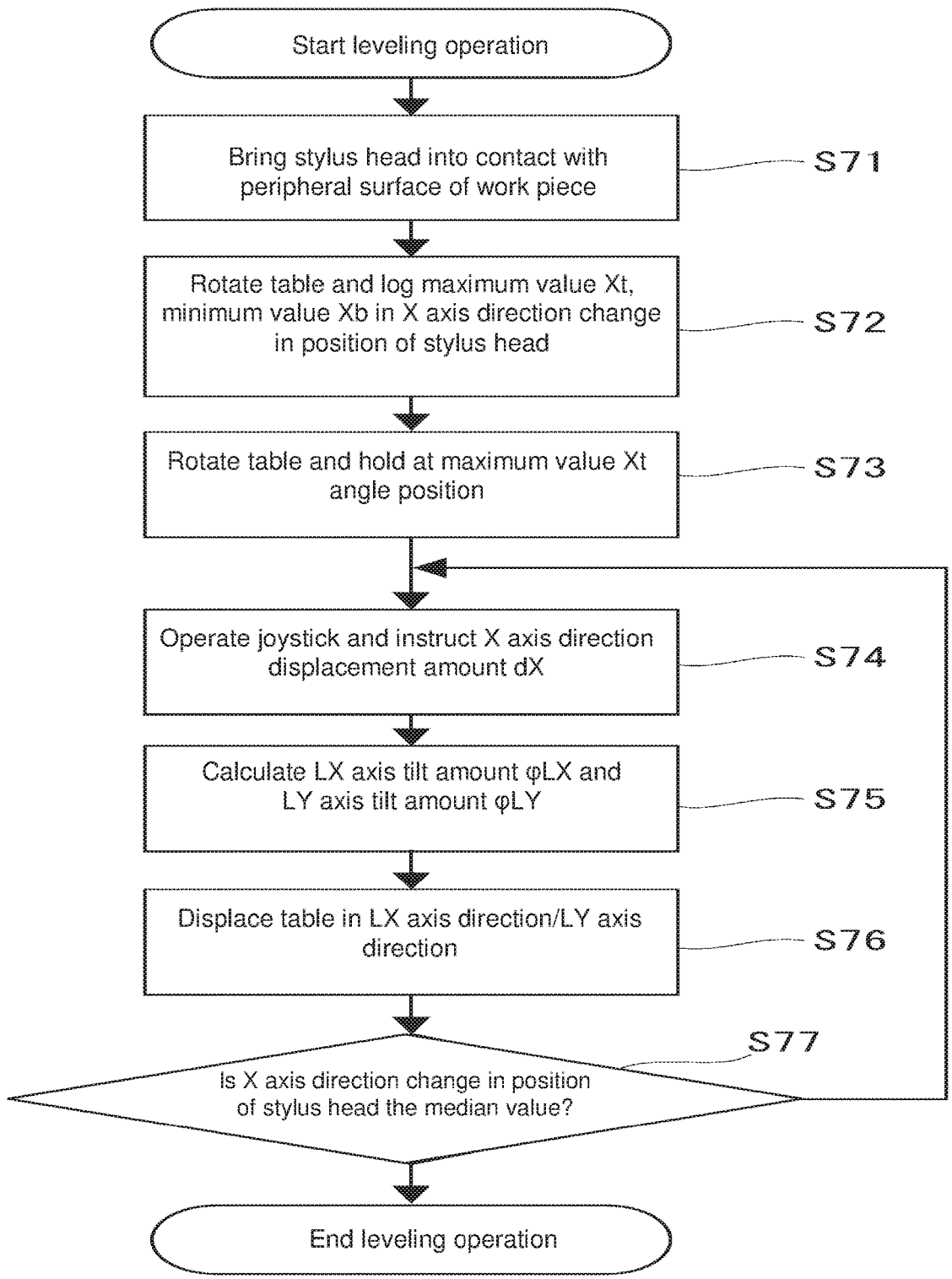
FIG. 7 is a flow chart illustrating a leveling operation according to the embodiment.

In FIG. 7, the worker P brings the stylus 41 of the detection device 40 into contact with the peripheral surface of the work piece W (process S71 in FIG. 7). The height position (Z axis position) at which the stylus 41 makes contact with the peripheral surface of the work piece W should be a different height position than that of the centering operation, and is preferably a position high on the work piece W and away from the placement plate 22.

In the state where the stylus 41 is in contact with the peripheral surface of the work piece W, the worker P issues an instruction to the control device 50 and causes the table 20 to rotate. Accompanying the rotation of the table 20, the stylus 41 traces the peripheral surface of the work piece W. Accordingly, in the control device 50, the change in position T of the peripheral surface where the stylus 41 currently makes contact is obtained from the contact position detector 57 and the profile shape of the work piece W at the height position (Z axis position) where the stylus 41 makes contact is measured. The profile shape is logged in the form of the changes of position T (θ) for the angles θ=0 to 360°.

In this example, even when the rotation axis line L of the table 20 and the center axis line C of the work piece W are aligned at the height position of the placement plate 22 of the table 20 (bottom surface of the work piece W), when the center axis line C of the work piece W is tilted with respect to the rotation axis line L of the table 20, the X axis position of the contact position of the stylus 41 (change in position T) may increase or decrease (oscillate) accompanying the rotation of the work piece W (i.e., in accordance with the angle θ of the rotation). Therefore, the maximum value Xt of the X axis direction change in position oscillating farthest in the +X direction and the minimum value Xb of the X axis direction change in position oscillating farthest in the −X direction come to be present in the changes in position T (θ) described above. The worker P logs the maximum value Xt and the minimum value Xb (process S72).

Next, the worker P displays the current X axis position of the stylus 41 in contact with the work piece W (change in position T obtained from the contact position detector 57) on the display 52, manually rotates the table 20 while looking at the display 52, stops the table 20 at an angle position where the current change in position T is the maximum value Xt (one of the maximum value Xt and the minimum value Xb), and holds the table 20 in this state (process S73).

Figure 8:
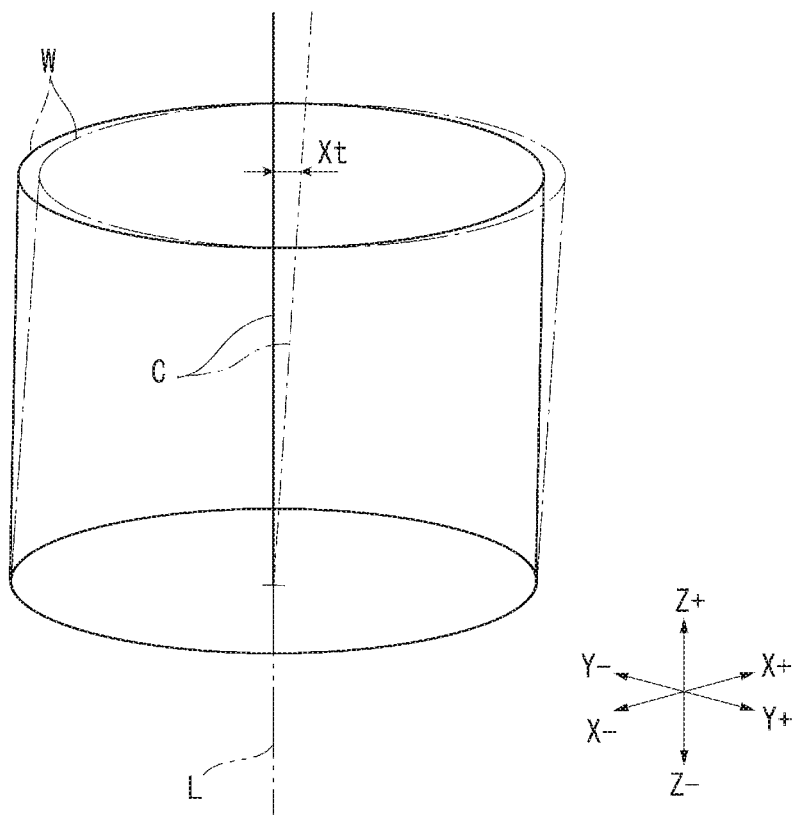
FIG. 8 is a schematic view illustrating a result of the leveling operation according to the embodiment.

In FIG. 8, the work piece W shown by a solid line is in a state where the center axis line C is aligned with the rotation axis line L of the table 20 (state where centering and leveling are achieved). In contrast, for the work piece W shown by a one-dot-dashed line, the center axis line C is aligned with the rotation axis line L of the table 20 at the height position of the placement plate 22 of the table 20 (bottom surface of the work piece W), but the center axis line C of the work piece W is tilted with respect to the rotation axis line L of the table 20. Therefore, at the position high on the work piece W, the center axis line C is offset from the rotation axis line L of the table 20 in the +X direction by the maximum value Xt.

Accordingly, when the work piece W is displaced by the maximum value Xt (amount of offset) in the −X direction, the centered state shown by the one-dot-dashed line in FIG. 6 can be achieved. In order to do this, while looking at the current X axis position of the stylus 41 (change in position T obtained from the contact position detector 57) displayed on the display 52, the worker P displaces the table 20 by slight increments of the operation amount dX using the joystick 53.

In other words, when the joystick 53 is operated, an instruction is issued for the operation amount dX corresponding to the tilt of the stick (process S74). The instructed operation amount dX is input to the leveling controller 59. When the leveling controller 59 detects the operation amount dX, the angle θ of the table 20 at that moment is obtained from the angle detector 56, and LX axis tilt amount φLX, and LY axis tilt amount φLY are calculated from the operation amount dX and the angle θ (process S75).

The leveling controller 59 further actuates the LX axis tilt mechanism 28 based on the calculated LX axis tilt amount φLX and actuates the LY axis tilt mechanism 29 based on the LY axis tilt amount φLY. Through simultaneous operation in the two axes, the placement plate 22 of the table 20 is tilted in each of the LX and LY axes. In addition, each of the tilts are combined (see FIG. 4) to achieve a tilt where, at the height position on the work piece W where the stylus 41 is in contact, the center axis line C of the work piece W displaces by the operation amount dX in the −X direction relative to the rotation axis line L (process S76).

When such displacement by the operation amount dX using the joystick 53 is repeated a plurality of times and the X axis position of the stylus 41 in contact with the work piece W (change in position T displayed on the display 52) equals the median value of the maximum value Xt and the minimum value Xb described above (median value of the amount of oscillation of the center axis line C) (Xt+Xb)/2 (process S77), the leveling operation ends at that position. In FIG. 8, in the state where the leveling operation is ended subsequent to the centering operation described above, the rotation axis line L of the table 20 and the center axis line C of the work piece W illustrated by the solid line are aligned.

Effect of the Embodiment

In the present embodiment, in a state where the stylus 41 is in contact with the work piece W, by rotating the table 20 and detecting the offset of the center axis line C of the work piece W, and operating the joystick 53 (external operator) while looking at the current position (change in position T) of the work piece W detected by the stylus 41, the offset of the center axis line C of the work piece W relative to the rotation axis line L of the table 20 can be gradually reduced, and by ultimately eliminating the offset, the centering operation can be performed.

Therefore, according to the present embodiment, there is no need for operations separately adjusting the CX axis and CY axis, and the centering operation can be simplified. Also, the centering operation based on the present embodiment (input of the operation amount in the operation direction using the joystick 53 (external operator)) is similar to an operation which gradually shifts the work piece W in the X axis direction when the center axis line C of the work piece W is offset with respect to the rotation axis line L of the table 20, for example, and the operation can be readily and intuitively understood by the worker P. Moreover, the CX axis displacement mechanism 26 and the CY axis displacement mechanism 27 are motor-driven. By incorporating the centering controller 58 into the control device 50 and by connecting the joystick 53 as the external operator, the centering operation can be readily implemented.

In the present embodiment, the leveling operation can be performed by repeating a procedure similar to that of the centering operation described above at a different height position on the work piece W. Therefore, according to the present embodiment, there is no need for operations separately adjusting the LX axis and LY axis, and the centering operation can be simplified. Also, the leveling operation based on the present embodiment (input of the operation amount in the operation direction using the joystick 53 (external operator)) is similar to an operation which gradually corrects the tilt of the work piece W along the X axis direction when the center axis line C of the work piece W is tilted, for example, and the operation can be readily and intuitively understood by the worker P. Moreover, the LX axis tilt mechanism 28 and the LY axis tilt mechanism 29 are motor-driven. By incorporating the leveling controller 59 into the control device 50 and by connecting the joystick 53 as the external operator, the leveling operation can be readily implemented.

Modifications

The present invention is not limited to the above-described embodiment, and includes modifications within a scope capable of achieving the advantages of the present invention. In the embodiment described above, the joystick 53 is used as the external operator. However, any device capable of adjusting at least one variable (the operation amount in the operation direction), such as an operation device having a slide volume, for example, may be used as the external operator, and the external operator may be connected to the device main body by a wired or a wireless connection. The external operator may also be mounted to an exterior portion of the device main body. For example, the joystick 53 may be installed on a front surface of the base 10. In the embodiment described above, the control device 50 is separate from the base 10, but the control device 50 may also be incorporated into the base 10. In such a case, the keyboard 51 and display 52 may be installed in the front surface of the base 10.

In the embodiment described above, in the centering operation and the leveling operation, the table 20 is stopped at the angle position where the current change in position T is the maximum value Xt, and is held at that position (processes S53 and S73). However, the angle position at which the table 20 is stopped may be either one of the maximum value Xt and the minimum value Xb. When using the minimum value Xb, the operation amount dX simply has the opposite orientation, but can otherwise be treated similarly.

In the embodiment described above, the procedures of calculating the CX axis displacement amount dCX, CY axis displacement amount dCY, LX axis tilt amount ɸLX, and LY axis tilt amount ɸLY from the operation amount dX and the angle θ may be some other calculation procedure, and an operation can be used in which the operation amount dX is distributed into components according to the angle θ, based on a common geometric arithmetic operation.

In the embodiment described above, the first and second displacement axis directions are respectively designated the CX axis direction and CY axis direction, and the CX axis displacement mechanism 26 and CY axis displacement mechanism 27 are provided as the first and second displacement mechanisms, respectively. Furthermore, the first and second tilt axis directions are respectively designated the LX axis direction and LY axis direction, and the LX axis tilt mechanism 28 and LY axis tilt mechanism 29 are provided as the first and second tilt mechanisms, respectively. However, the present invention is not limited to such an arrangement. For example, a CX axis displacement mechanism, CY axis displacement mechanism, LX axis tilt mechanism, and LY axis tilt mechanism having a different configuration may be provided in other embodiments, and other axis directions may be designated for the displacement axis direction and tilt axis direction. Moreover, the present invention is not limited to a configuration that includes both the first and second displacement mechanisms and the first and second tilt mechanisms, and may instead have a configuration that includes the first and second displacement mechanisms but not the first and second tilt mechanisms, or a configuration that includes the first and second tilt mechanisms but not the first and second displacement mechanisms.

The present invention can be used as a roundness measuring device that is readily implemented and has a simple rotation axis line adjustment operation.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A roundness measuring device comprising:
a table provided with a placement plate on which a work piece is to be placed, the table configured to rotate around a rotation axis line and cause the work piece placed on the placement plate to rotate;
a detector provided with a stylus brought into contact with the work piece placed on the placement plate, the detector configured to detect a change in position of the stylus, wherein:
the stylus is brought into contact with a peripheral surface of the work piece when the table is rotated, and
a measurement is made of a circular shape of the work piece from the change in position of the stylus detected by the detector;
a first displacer and a second displacer installed on the table, the first displacer and second displacer configured to respectively displace the placement plate in a first displacement axis direction and a second displacement axis direction orthogonal to the rotation axis line;
an angle detector configured to detect a current rotation angle of the table;
an external operator configured to issue an instruction for an operation amount of the work piece placed on the placement plate, the operation amount occurring in an operation direction orthogonal to the rotation axis line; and a centering controller configured to calculate a first displacement amount in the first displacement axis direction and a second displacement amount in the second displacement axis direction from the operation amount and the rotation angle, the centering controller further configured to drive the first and second displacers based on the respective calculated first and second displacement amounts.

2. The roundness measuring device according to claim 1, wherein a first tilter and a second tilter are further installed on the table, the first and second tilters respectively adjusting a tilt of the placement plate relative to a first tilt axis direction and a second tilt axis direction orthogonal to the rotation axis line, and a leveling controller is further provided calculating a first tilt amount relative to the first tilt axis direction and a second tilt amount relative to the second tilt axis direction from the operation amount and the rotation angle θ, and driving the first and second tilters based on the respective calculated first and second tilt amounts.

3. A roundness measuring device comprising:

a table provided with a placement plate on which a work piece is to be placed, the table configured to rotate around a rotation axis line and cause the work piece placed on the placement plate to rotate; and a detector provided with a stylus brought into contact with the work piece placed on the placement plate, the detector configured to detect a change in position of the stylus, wherein:

the stylus is brought into contact with a peripheral surface of the work piece when the table is rotated, and a measurement is made of a circular shape of the work piece from the change in position of the stylus detected by the detector;

a first tilter and a second tilter installed on the table, the first tilter and second tilter configured to respectively adjust a tilt of the placement plate relative to the first tilt axis direction and the second tilt axis direction;

an angle detector configured to detect a current rotation angle of the table;

an external operator configured to issue an instruction for an operation amount of the work piece placed on the placement plate, the operation amount occurring in an operation direction orthogonal to the rotation axis line; and a leveling controller configured to calculate a first tilt amount relative to the first tilt axis direction and a second tilt amount relative to the second tilt axis direction from the operation amount and the rotation angle, and further configured to drive the first and second tilters based on the respective calculated first and second tilt amounts.

4. The roundness measuring device according to claim 1, wherein the first and second displacement amounts are values in which a distance corresponding to the instructed operation amount in the operation direction is distributed into components in the first and second displacement axis directions in accordance with the rotation angle, such that a displacement amount combining the first and second displacement amounts is equal to a distance corresponding to the operation amount in the operation direction.

5. The roundness measuring device according to claim 2, wherein the first and second displacement amounts are values in which a distance corresponding to the instructed operation amount in the operation direction is distributed into components in the first and second displacement axis directions in accordance with the rotation angle, such that a displacement amount combining the first and second displacement amounts is equal to a distance corresponding to the operation amount in the operation direction.

6. The roundness measuring device according to claim 2, wherein:

the first and second tilt amounts are displacement amounts in the operation direction at a rotation axis line direction position of the stylus, and the first and second tilt amounts are values distributed into components in the first and second tilt axis directions in accordance with the rotation angle, such that a tilt amount combining the first and second tilt amounts is equal to a distance corresponding to the instructed operation amount in the operation direction at a position of the stylus in the rotation axis line direction.

7. The roundness measuring device according to claim 3, wherein:

the first and second tilt amounts are displacement amounts in the operation direction at a rotation axis line direction position of the stylus, and the first and second tilt amounts are values distributed into components in the first and second tilt axis directions in accordance with the rotation angle, such that a tilt amount combining the first and second tilt amounts is equal to a distance corresponding to the instructed operation amount in the operation direction at a position of the stylus in the rotation axis line direction.

* * * * *